US009135934B2

(12) United States Patent
Taratorin

(10) Patent No.: US 9,135,934 B2
(45) Date of Patent: Sep. 15, 2015

(54) WRITE HEAD TESTER USING INDUCTANCE

(75) Inventor: Alexander M. Taratorin, Palo Alto, CA (US)

(73) Assignee: Infinitum Solutions, Inc., Santa Clara, CA (US)

( * ) Notice: Subject to any disclaimer, the term of this patent is extended or adjusted under 35 U.S.C. 154(b) by 549 days.

(21) Appl. No.: 13/298,062

(22) Filed: Nov. 16, 2011

(65) Prior Publication Data

US 2012/0056619 A1  Mar. 8, 2012

Related U.S. Application Data

(62) Division of application No. 11/940,970, filed on Nov. 15, 2007, now Pat. No. 8,080,992.

(51) Int. Cl.
*G01R 33/12* (2006.01)
*G11B 5/455* (2006.01)

(52) U.S. Cl.
CPC .............. *G11B 5/455* (2013.01); *G11B 5/4555* (2013.01)

(58) Field of Classification Search
CPC ....................................................... G11B 5/455
USPC ......................................................... 324/210
See application file for complete search history.

(56) References Cited

U.S. PATENT DOCUMENTS

| 5,721,488 | A | 2/1998 | Sakai et al. |
| 6,534,974 | B1 | 3/2003 | Bowen et al. |
| 6,587,805 | B2 | 7/2003 | Aslami |
| 6,646,448 | B2 | 11/2003 | Ko et al. |
| 7,550,967 | B1 | 6/2009 | Patland et al. |
| 2001/0010602 | A1* | 8/2001 | Takahashi ................. 360/25 |
| 2002/0038191 | A1* | 3/2002 | Ko et al. ................... 702/117 |
| 2003/0193743 | A1 | 10/2003 | Sasaki et al. |
| 2007/0273370 | A1* | 11/2007 | Yasunaga et al. ......... 324/210 |
| 2008/0049351 | A1 | 2/2008 | Yamanaka et al. |
| 2008/0266718 | A1 | 10/2008 | Saruki et al. |
| 2008/0316630 | A1 | 12/2008 | Lamberts et al. |

FOREIGN PATENT DOCUMENTS

JP           03132911  A       6/1991

OTHER PUBLICATIONS

Xing et al., "Experimental Study of Perpendicular Write Head Field Rise Time", Paper AB-12, MMM/Intermag 2007, 3 pgs.
Xing, Xinzhi et al., "Experimental Study of Perpendicular Write Head Field Rise Time," IEEE Transactions on Magnetics, vol. 43, No. 6, pp. 2181-2183, Jun. 2007.

* cited by examiner

*Primary Examiner* — Jay Patidar
*Assistant Examiner* — David M. Schindler
(74) *Attorney, Agent, or Firm* — Silicon Valley Patent Group LLP

(57) ABSTRACT

A write head is tested by measuring the effect that magnetic fields have on the inductance of the write head. For example, a perpendicular write head may be placed in a magnetic field with a first angle, e.g., non-parallel and non-perpendicular, to the air bearing surface and the inductance is measured. After altering the angle of the magnetic field the inductance is again tested. In another embodiment, the angles may be parallel and perpendicular to the air bearing surface. The difference in the inductance value can be used to determine a characteristic of the write head, such as the presence of a recording pole. In some embodiments, the inductance may be measured while applying a bias current to the write head while the write head is in an external magnetic field.

13 Claims, 10 Drawing Sheets

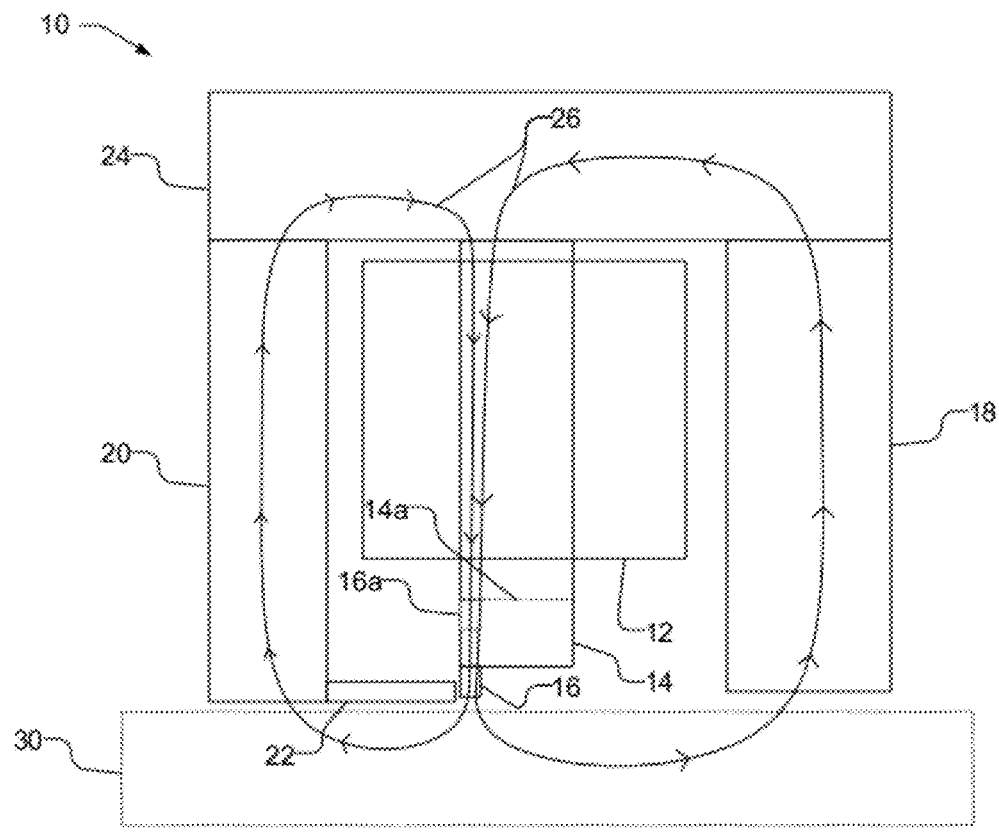
Fig. 1
(Conventional)
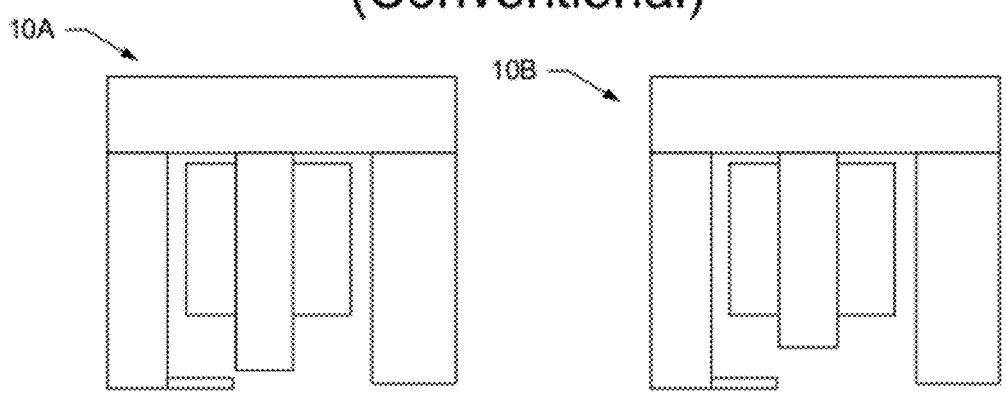
Fig. 2A
(Conventional)
Fig. 2B
(Conventional)

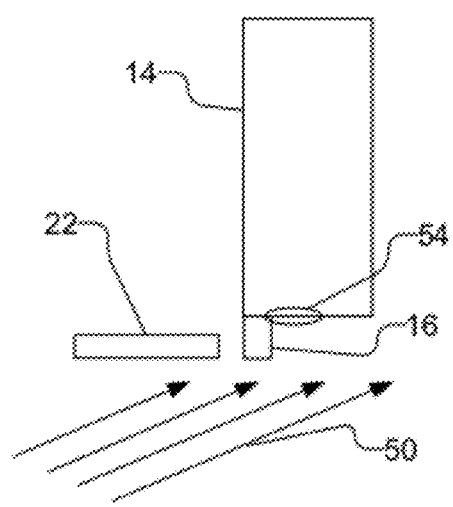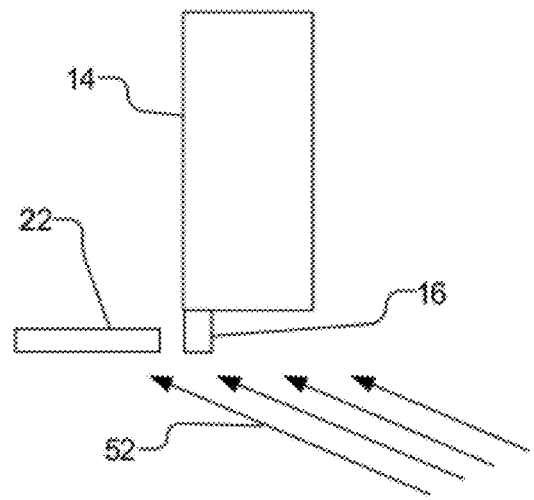
Fig. 4A      Fig. 4B
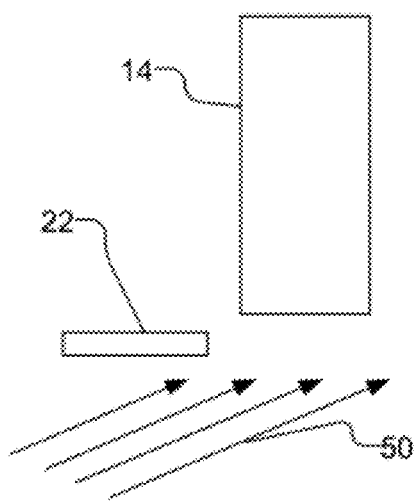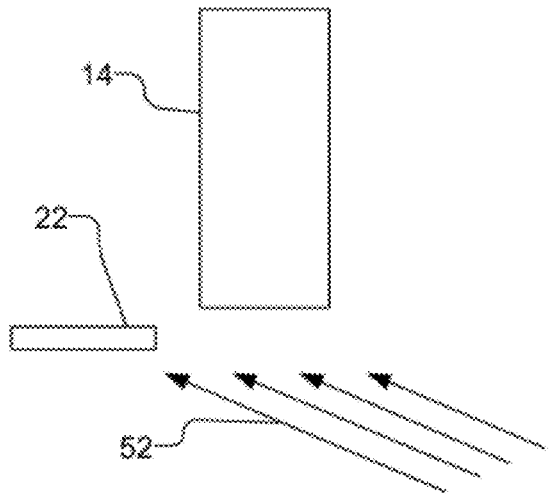
Fig. 5A      Fig. 5B

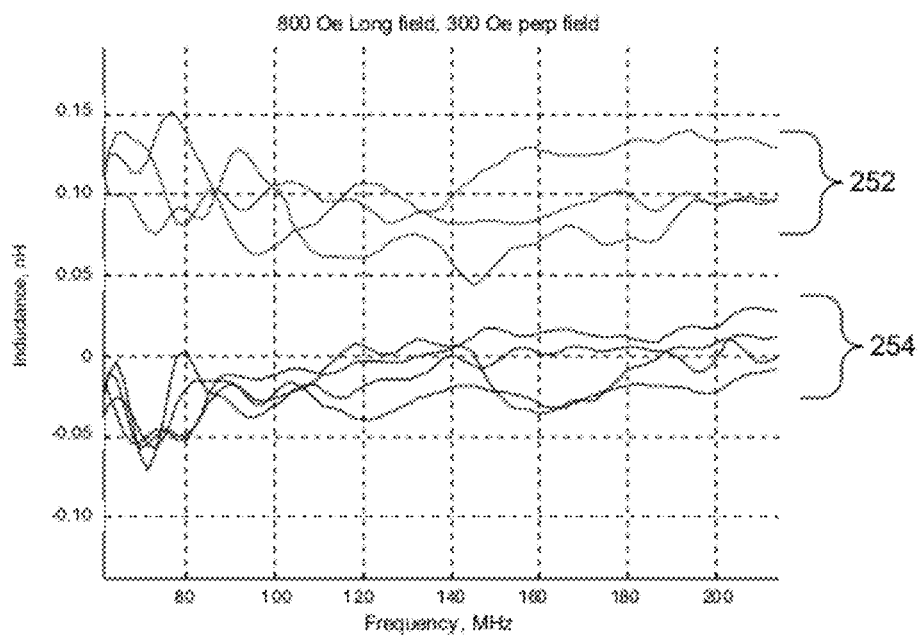
Fig. 9
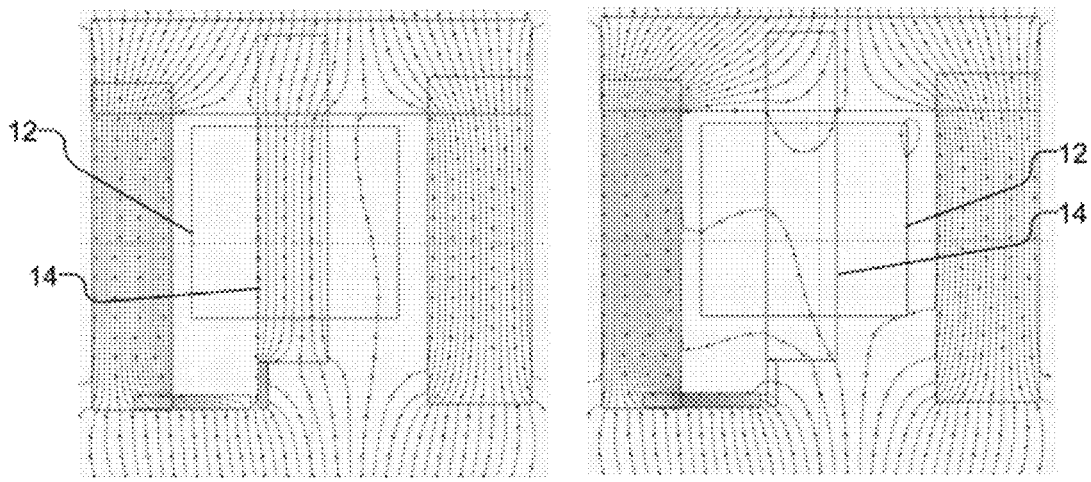
Fig. 11A
Fig. 11B

WRITE HEAD TESTER USING INDUCTANCE

CROSS REFERENCE TO RELATED APPLICATIONS

This application is a divisional of U.S. Ser. No. 11/940,970, filed Nov. 15, 2007, which is incorporated by reference herein in its entirety.

FIELD OF THE INVENTION

The present application relates to testing magnetic media storage devices and in particular to testing write head elements using inductance.

BACKGROUND

Storage devices based on magnetic recording technology are well known and are commonly used in devices such as computers and digital electrical household appliances. In operation, a magnetic write head is used to magnetize bits of data on the recording medium, commonly referred to as a hard disk, while a read head can be used to read the bits of data from the hard disk. Conventional magnetic recording heads magnetize the hard disk in a direction parallel to the surface of the disk and are therefore known as longitudinal recording head.

In order to increase storage capacity of storage devices, perpendicular recording heads are now being used. As the name implies, perpendicular recording heads magnetize the hard disk with bits of data that are perpendicular to the surface of the disk. The perpendicular bits of data are substantially smaller than longitudinal bits recorded by longitudinal recording heads. Accordingly, the recording density and, thus, the storage capacity produced by perpendicular recording heads is substantially increased relative to longitudinal recording heads.

As with longitudinal recording heads, it is desirable to test perpendicular recording heads early in the manufacturing process to increase yield and reduce costs. Unfortunately, perpendicular recording heads are exceedingly difficult to test prior to completion of the manufacturing process, i.e., installation of the head in a head gimbal assembly. Accordingly, most tests of perpendicular recording heads are performed after manufacture is complete.

Thus, an improved method and apparatus for testing recording heads, and in particular perpendicular write head, that may be used prior to completion of the head is desired.

SUMMARY

In accordance with an embodiment of the present invention, a write head, such as a perpendicular write head, is tested by measuring the effect that magnetic fields have on the inductance of the write head. In one embodiment, a write head is placed in a magnetic field at a first angle to the air bearing surface and the inductance is measured. The magnetic field is then adjusted to a different to a different angle, e.g., an opposite angle relative to normal to the air bearing surface, and the inductance is again tested. In one embodiment, the angles are non-parallel and non-perpendicular to the air bearing surface. The difference in the inductance value can be used to determine a characteristic of the write head, such as the presence of a recording pole or intrinsic yoke anisotropy characterization. In another embodiment, the angles of the magnetic fields are parallel and perpendicular to the air bearing surface and the measured inductance values are used to determine the presence or absence of defects in the upper yoke.

In another embodiment, a write head is subjected to an external magnetic field that at least partially saturates the write head. A bias current is applied to the write head to produce a magnetic field, while the write head is in the external magnetic field. The inductance of the write head is measured while the bias current is applied and while the write head is in the external magnetic field. A characteristic of the writer head, such as how effectively the write head can write data, or whether the recording pole is corroded, can be determined based on the measured inductance.

In another embodiment, the write head is subjected to multiple magnetic fields and the inductance measured after the magnetic fields are removed. By comparing the initial inductance measurement with subsequent inductance measurements, the hysteresis of the write head can be determined.

In another embodiment, a write head tester includes magnetic field generator for applying an external magnetic field to a write head, such as a perpendicular write head. The magnetic field generator is configured to produce a first magnetic field that is at a first angle with respect to an air bearing surface of the write head, and a second magnetic field that is a different angle to the air bearing surface. The tester includes an inductance meter configured to be coupled to the write head and a processor coupled to the inductance meter and the magnetic field generator. The processor is also configured to receive the inductance measurements, and includes a computer-usable medium having computer-readable program code embodied therein for causing the processor to determine and record a characteristic of the write head based on the received inductance measurements.

In another embodiment, a write head tester includes magnetic field generator for applying an external magnetic field to a write head, a write circuit for supplying a bias, which may be a voltage or a current, to the write head and an inductance meter. A processor configured to receive the inductance measurements includes a computer-usable medium having computer-readable program code embodied therein for causing the processor to control the bias current to the write head and to determine and record a characteristic of the write head based on a measured inductance of the write head while a bias current is applied to the write head and while the write head is in the external magnetic field.

In yet another embodiment, a write head tester includes a means for applying and removing magnetic fields of opposite polarities in a write head, which may be, e.g., a magnetic field generator that produces an external magnetic field that is applied to the write head and a write circuit configured to be coupled to the write element to provide a bias current or voltage to the write element. The write head tester also includes an inductance meter and a processor that receives the inductance measurements. The processor includes a computer-usable medium having computer-readable program code embodied therein for causing the processor to control the means for applying a magnetic field and the inductance meter to measure the inductance before a magnetic field is applied to the write head, as well as after magnetic fields of differing polarities are applied and removed from the write head. The code causes the processor to determine and record the hysteresis of the write head based on the measured inductances.

BRIEF DESCRIPTION OF THE DRAWINGS

FIG. 1 is a simplified illustration of a cross-sectional view of a typical perpendicular write head.

FIGS. 2A and 2B illustrate side views of perpendicular write heads with the recording pole corroded and with different levels of recession of the main pole.

FIGS. 4A and 4B illustrate portions of a perpendicular write head in non-perpendicular and non-parallel magnetic fields with respect to the air bearing surface.

FIGS. 5A and 5B illustrate portion of a perpendicular write head with a missing recording pole in non-perpendicular and non-parallel magnetic fields with respect to the air bearing surface.

FIG. 9 is a graph illustrating the differential inductance results for four "bad" write heads and three "good" write heads with corroded recording poles.

FIG. 11A illustrates a write head placed in a saturating perpendicular magnetic field.

FIG. 11B is similar to FIG. 11A, but illustrates the write head with an applied bias current to alter the magnetization of the main pole.

DETAILED DESCRIPTION

Figure 3:
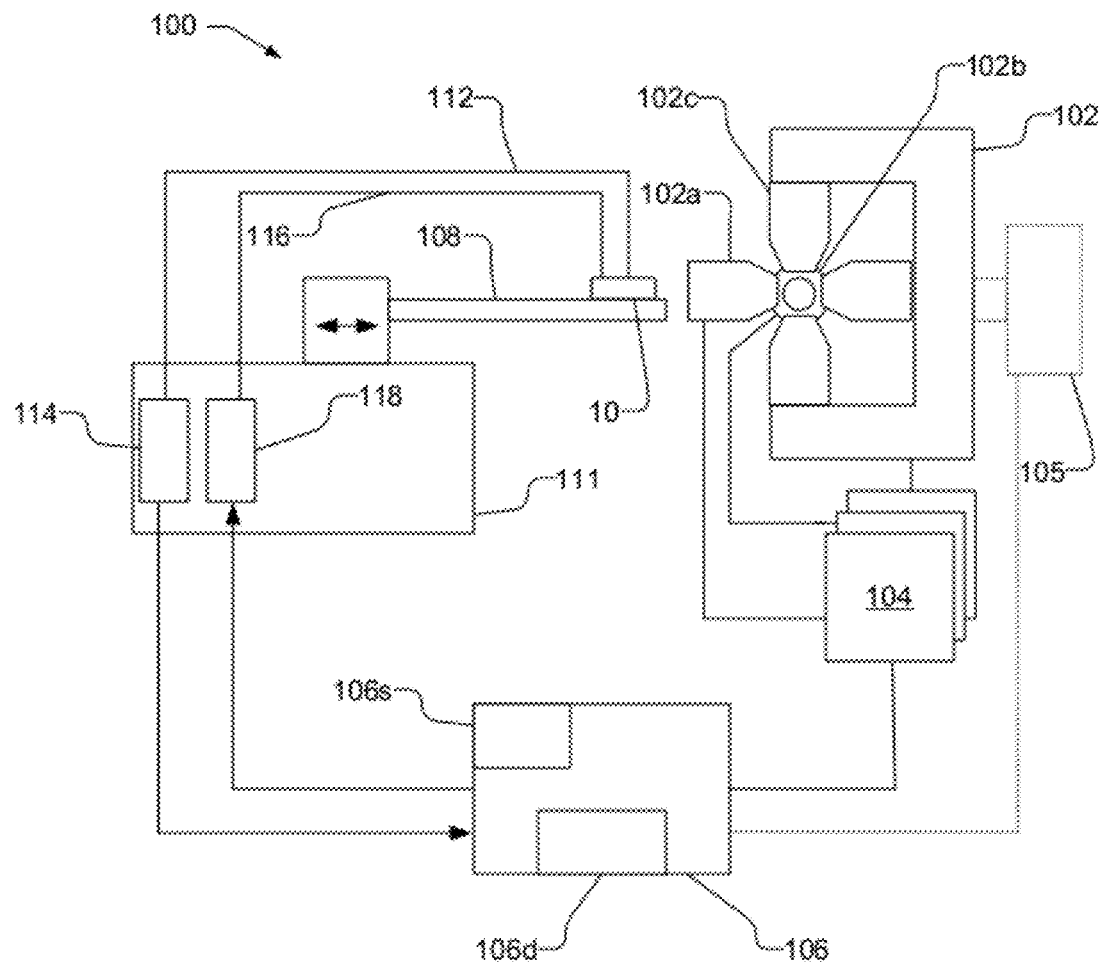
FIG. 3 schematically illustrates a write head test device that can test the inductance of the write head and the effect of magnetic fields have on the write head in accordance with an embodiment of the present invention.

FIG. 1 is a simplified illustration of a cross-sectional view of a typical perpendicular write head 10. The write head 10 includes a write coil 12 that surrounds a main pole 14. At the end of the main pole 14, near the air bearing surface (ABS), is the recording pole 16, which is the element that writes data on the recording medium 30. The write head 10 also includes a return pole 18, a trailing pole 20, a trailing shield 22 and an upper yoke 24 that connects the main pole 14, return pole 18 and trailing pole 20.

In operation, a write current in the write coil 12 produces magnetic flux, illustrated as broken line 26, that flow through the main pole 14 and is concentrated at the air bearing surface ABS by the recording pole 16. The magnetic flux passes through a layer on the magnetic recording media 30 and the magnetic loop is closed through the return pole 18 and upper yoke 24. The return pole 18 is a massive structure compared to the recording pole 16. By way of example, the recording pole 16 typically is a very small fraction (less than 0.01%) of the mass of the return pole 18.

The trailing shield 22 is separated from the recording pole 16 by at least 60-120 nm and absorbs part of the magnetic flux 26 to close the magnetic loop through the trailing pole 20 and upper yoke 24. Early generations of perpendicular write heads did not include a trailing shield 22 and are typically called "single pole heads". The main function of the trailing shield 22 is to control the angle of the recording field in the media 30. As will be apparent from the following disclosure, perpendicular write heads with and without a trailing shield may be measured in accordance with embodiments of the present invention.

The structure of the main pole 14 is shaped so as to provide flux concentration in the recording pole 16. However, in the manufacturing process, the degree of recession of the main pole 14, i.e., the distance from the air bearing surface ABS, may vary as indicated by broken lines 16A. Variation in the recession of the main pole 14 may alter the distance of the recording pole from the air bearing surface ABS, as illustrated by broken lines 16a, which is generally referred to as the recording "throat height". The throat height is a critical parameter of a perpendicular write head 10 and is generally designed as to provide an optimal flux concentration at the bottom of the recording pole 16. Throat height ideally should be similar to the height of the trailing shield 22. The variation in recession of the main pole 14 has a significant contribution to the performance of a perpendicular write head.

A significant defect that may occur during the manufacture of a perpendicular write head 10 is the corrosion of the recording pole 16, as illustrated in write head 10a in FIG. 2A. The recording pole 16 may be corroded and the main pole 14 may be significantly recessed, as illustrated by write head 10b in FIG. 2B. It should be understood that other defects may occur during the manufacture of perpendicular write heads.

FIG. 3 is a schematic illustration of a write head test device 100 that can test the inductance of a write head, such as perpendicular write head 10, and the effect of magnetic fields have on the write head in accordance with an embodiment of the present invention. It should be understood that the write head test device 100 may be used with other write heads, such as longitudinal write heads, if desired. Testing device 100 includes at least one pair of electromagnetic coils 102, which e.g., is a C-core electromagnetic coil with windings, for producing the desired external magnetic field to the write head 10 under test. By way of example, FIG. 3 illustrates three pairs of electromagnetic coils 102a, 102b, and 102c (only one coil is shown for coil 102b). Power supplies 104 are connected to and provide the excitation currents to the electromagnetic coils 102a, 102b, and 102c to produce the desired magnetic field.

In accordance with one embodiment, the write head test device 100 measures the inductance of the write head while the write head is subjected to a magnetic field that is non-perpendicular and non-parallel to the air bearing surface (ABS), which is sometimes referred to herein as a "titled" magnetic field. FIGS. 4A and 4B illustrate side views of a main pole 14 and recording pole 16 along with a trailing shield 22 in tilted magnetic fields 50 and 52, respectively. The tilted magnetic fields 50 and 52 may be parallel to a plane from the front to the back of the write head, or may be at a non-parallel angle relative to the plane from the front to the back of the write head. When the write head structure is placed in titled magnetic fields 50, 52, the recording pole 16 creates an asymmetry in the titled magnetic field. As illustrated in FIG. 4A, in one magnetic field orientation a, the flux lines will concentrate on the recording pole 16 creating a "magnetic shadow" affect at the surface of the recessed mail pole 14, as illustrated by the oval 54. In the opposed magnetic field orientation, as illustrated in FIG. 4B, the recording pole 16 does not block the flux lines, allowing more flux to reach the main pole 14 and, accordingly, a different yoke saturation occurs.

FIGS. 5A and 5B are similar to FIGS. 4A and 4B; however, the recording pole is corroded and is therefore missing. Without the recording pole 16 in FIG. 5A, the write head is more symmetrical in the titled magnetic field. Accordingly, the yoke saturation is more uniform in both magnetic field orientations.

Figure 6:
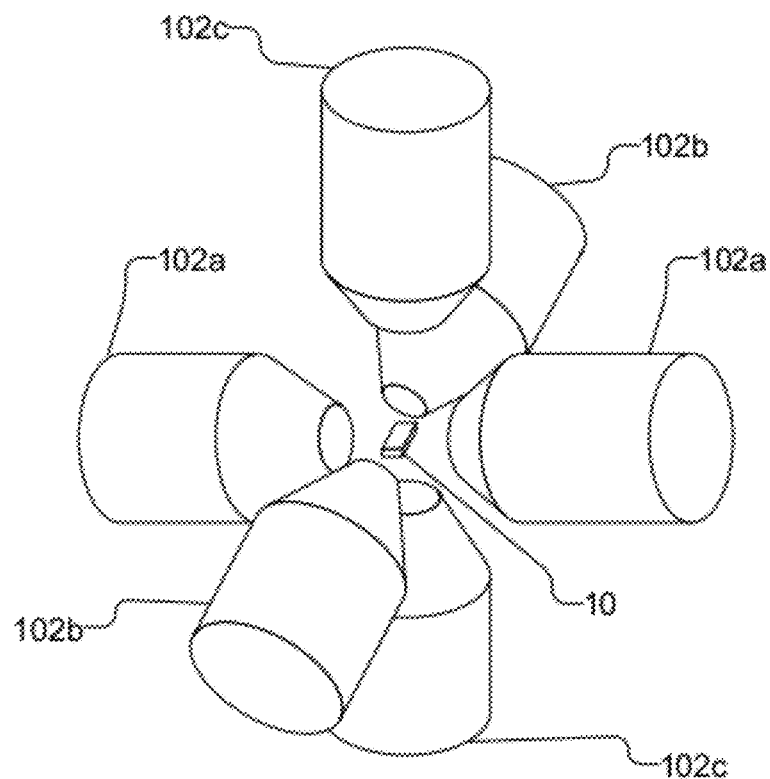
FIG. 6 illustrates three pairs of electromagnetic coils that may be used to provide the tilted magnetic field.

FIG. 6 illustrates three pairs of electromagnetic coils 102a, 102b, 102c that may be used to provide the tilted magnetic field. If desired, only two pairs of electromagnetic coils 102a and 102c may be used. With the use of two pairs of electromagnetic coils, e.g., 102a and 102c, and appropriate control of the current in the electromagnetic coils, a magnetic field may be produced with any desired orientation along a plane, e.g., a plane normal to the air bearing surface and from the front to the back of the write head. For example, when the electromagnetic coils 102a and 102b produce magnetic fields of the same magnitude, the resulting magnetic field is titled 45° with respect to the write head 10. The resulting angle of the magnetic field may be varied by adjusting the excitation current to one or both of the electromagnetic coils 102a and 102b. With the use of three pairs of electromagnetic coils 102a, 102b, and 102c and appropriate control of the current in the electromagnetic coils a magnetic field with any desired orientation in three dimensions may be produced. Thus, for example, the magnetic field may have any desired angle with respect to normal to the air bearing surface. Additionally, the magnetic field may have any desired azimuthal angle with respect to the down-track direction, which, as well understood in the art, is the direction of the write head when the write head is flying over a disk.

Figure 7:
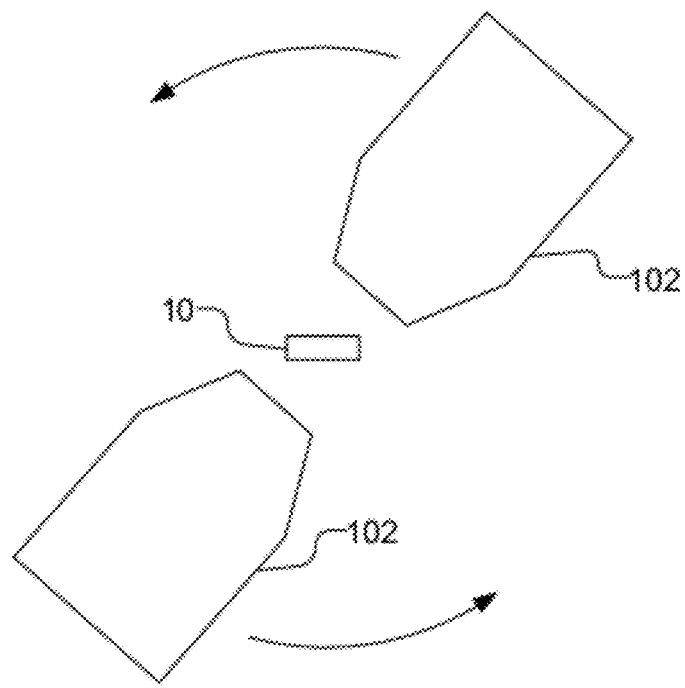
FIG. 7 illustrates a single pair of rotatable electromagnetic coil that may be used to provide the tilted magnetic field.

In another embodiment, a titled magnetic field may be generated by a rotating magnet 102, such as a permanent magnet or a pair of electromagnetic coils, as illustrated by the arrows in FIG. 7. With a rotatable magnet 102, any desired magnetic field orientation may be produced by physically rotating and pivoting the magnet 102, e.g., with an actuator 105 illustrated in FIG. 3. Alternatively, the write head 10 under test may be rotated within the magnetic field while the electromagnetic coils 102 are held stationary. It should be understood that other configurations of permanent magnets and/or electromagnets to produce the desired titled magnetic fields may be used with the present invention.

As illustrated in FIG. 3, the power supplies 104 are connected to and controlled by a processor 106. The processor 106 controls the coils 102a, 102b, and 102c, via the power supplies 104, to produce the desired magnetic field. In one embodiment, the processor 106 controls an actuator 105, illustrated with broken lines, that rotates at least one electromagnetic coil 102.

The write head 10 under test is mounted on a suspension 108 that is coupled to a base 111 by an actuator 110 for translating the write head 10 in and out of the test area between the electromagnetic coils 102a, 102b. It should be understood that the present invention may be used with write heads 10 in various stages of manufacturing, including bar level, slider level, and head gimbal assembly level or other state of manufacture.

An inductance probe 112 couples the write head 10 to an inductance meter 114. The inductance meter 114 is connected to the processor 106, which receives and analyzes the data provided by the inductance meter 114. The process 106 includes a computer-usable medium having computer-readable program code embodied therein for causing the processor to control the tester and to perform a desired analysis, as described herein. The data structures and software code for automatically implementing one or more acts described in this detailed description can be implemented by one of ordinary skill in the art in light of the present disclosure and stored on a computer readable storage medium, which may be any device or medium that can store code and/or data for use by a computer system such as processor 106. This includes, but is not limited to, magnetic and optical storage devices such as disk drives, magnetic tape, compact discs, and DVDs (digital versatile discs or digital video discs), and computer instruction signals embodied in a transmission medium (with or without a carrier wave upon which the signals are modulated).

The processor 106 includes storage 106s and a display 106d for storing and/or displaying the results of the analysis of the data. In addition, if desired a write pin 116 may electrically couple the write element of the write head 10 to a write circuit 118. The write circuit 118 may be a voltage source or current source and can provide a bias current to the inductive write element on the write head 10. The write circuit 118 is also coupled to the processor 106, which can control the magnitude and frequency of the bias current. The frequency of the bias current may include DC, and the polarity of the DC bias current may be controlled. Moreover, a DC offset (of either polarity) may be provided to a non-DC bias frequency.

If desired, the tester 100 may include additional circuitry that may be coupled to the write head for additional measurements of the head, e.g., read head measurements.

Figure 8:
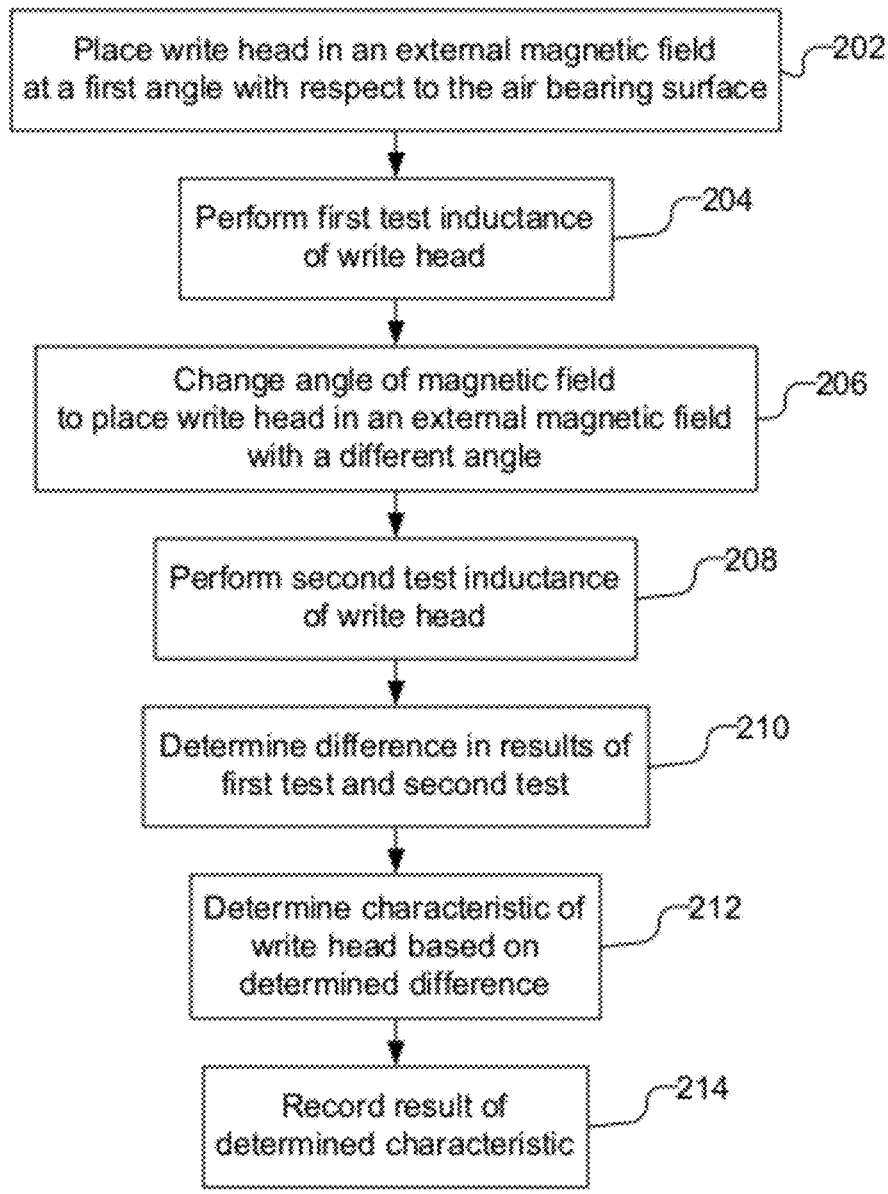
FIG. 8 is a flow chart describing the testing of a write head in tilted magnetic fields in accordance with one embodiment of the present invention.

FIG. 8 is a flow chart describing the testing of a write head, such as perpendicular write head 10, in accordance with one embodiment of the present invention. It should be understood that other types of write heads, such as longitudinal write heads, may similarly be tested using the process described in FIG. 8. The perpendicular write head 10 is loaded onto the suspension 108 (shown in FIG. 3) and placed in a titled magnetic field (block 202). It should be understood that the tilted magnetic field is non-perpendicular and non-parallel to the air bearing surface of the write head, and may be at an angle of between 1-89 degrees with respect to normal of the air bearing surface. More particularly, the angle may be between 45-89 degrees from normal or more particularly between 60-90 degrees from normal. It has been found that an angle of approximately 70-85 degrees from normal to the air bearing surface is adequate with some write heads.

An inductance test is then performed on the write head 10 while the write head is within the magnetic field (block 204). The inductance test may be performed using, e.g., an Agilent Network Analyzer or other appropriate inductance meter. The result of the first inductance test may be stored in processor 106.

The angle of the magnetic field relative to the write head 10 is then changed to a different angle. By way of example, the angle can be changed so that it is the opposite angle with respect to normal to the air bearing surface (block 206). In other words, if the first magnetic field was 70 degrees from normal of the air bearing surface in a first direction, e.g., towards the front of the write head, the second magnetic field will be 70 degrees from normal to the air bearing surface in the opposite direction, e.g., towards the back of the write head, i.e., +70 degrees and −70 degrees. It should be understood that angle of the second magnetic field need not be precisely equal to the angle of the first magnetic field with respect to normal, but in one embodiment is within approximately 5 to 10 degrees. In other embodiments, the second angle is not equal in magnitude to the first angle and may not be in the opposite direction from the first angle with respect to normal, e.g., the first angle may be +80 degrees and the second angle may be +40 degrees.

A second inductance test is then performed on the write head 10 while the write head is within the second magnetic field (block 206). The result of the second inductance test again may be stored in processor 106.

Using the results from the first inductance test and the second inductance test, characteristics of the write head 10 may be determined, such as whether the recording pole 16 is non-corroded or intrinsic yoke anisotropy direction. Other characteristics of the write head that maybe determined may simply be the presence (and functioning) of the recording pole 116, the throat height or other similar desired information. In one embodiment, the difference in the results of the first inductance test and the second inductance test is determined (block 210) and the difference is used to determine the desired characteristic of the write head 10 (block 212). By way of example, the measured inductance differential may be compared to a threshold to determine good or bad write heads. The test result, e.g., the determined characteristic for the write head 10, or the determined difference in results, is then recorded such as by storing in a fixed medium, such as storage or memory of the processor 106, or by displaying to a user, e.g., on a monitor or printed document. The recorded result may be used by a user to, e.g., reject bad write heads or to sort write heads based on characteristics.

It should be understood that additional magnetic fields and inductance tests may be performed if desired. For example, the magnetic field polarity at both angles may be reversed and additional inductance tests may be performed if desired.

FIG. 9 is a graph illustrating the differential inductance results for three "good" write heads and four "bad" write heads with corroded recording poles. Both the good write heads and the bad write heads included low, moderate and high recession values for the main pole 14. The three good write heads produced the differential inductances curves labeled 252, which all show relatively high differential inductance values. The four bad write heads produced the differential inductance curves labeled 254, which show relatively low differential inductance values. Thus, as can be seen in FIG. 9, good and bad write heads can be easily and accurately determined, e.g., by applying an appropriate threshold, e.g., of 0.04 nH.

If desired, statistical techniques may be used to assist in the analysis. For example, the inductance measurements and/or differential inductance result may be averaged (or other ways statistically manipulated) over a number of frequencies to obtain a single differential inductance value. Alternatively, it may be possible to measure inductance for a single frequency or small number of frequencies, e.g., at 50 MHz or 20 MHz, to increase the speed of the measurement and simplify the analysis. If desired, a higher frequency, such as 100 MHz may be used.

Another test that may be performed by write head tester 100 similarly measures the inductance of the write head while subjected to different magnetic fields with different orientations. This embodiment uses external magnetic fields that are parallel and perpendicular to the air bearing surface of a write head, which may be, e.g., a perpendicular write head. It should be understood that other types of write heads, such as longitudinal write heads, may similarly be tested. By way of example, the inductance is measured while the write head 10 is in a parallel magnetic field, i.e., a magnetic field that is parallel to the air bearing surface. The magnetic field is then adjusted to be perpendicular to the write head, i.e., normal to the air bearing surface, and the inductance is again measured. By analyzing the two measured inductances and the levels of saturation that can be determined from the inductances, characteristics of the upper yoke 24 may be determined. For example, when the write head 10 is saturated in a perpendicular magnetic field, but in a parallel magnetic field has a much smaller saturation and has low inductance, e.g., 0.5 nH as opposed to 1 nH, the write head 10 can be recognized as defective, presumably due to a crack or other defect in the upper yoke 24.

Figure 10:
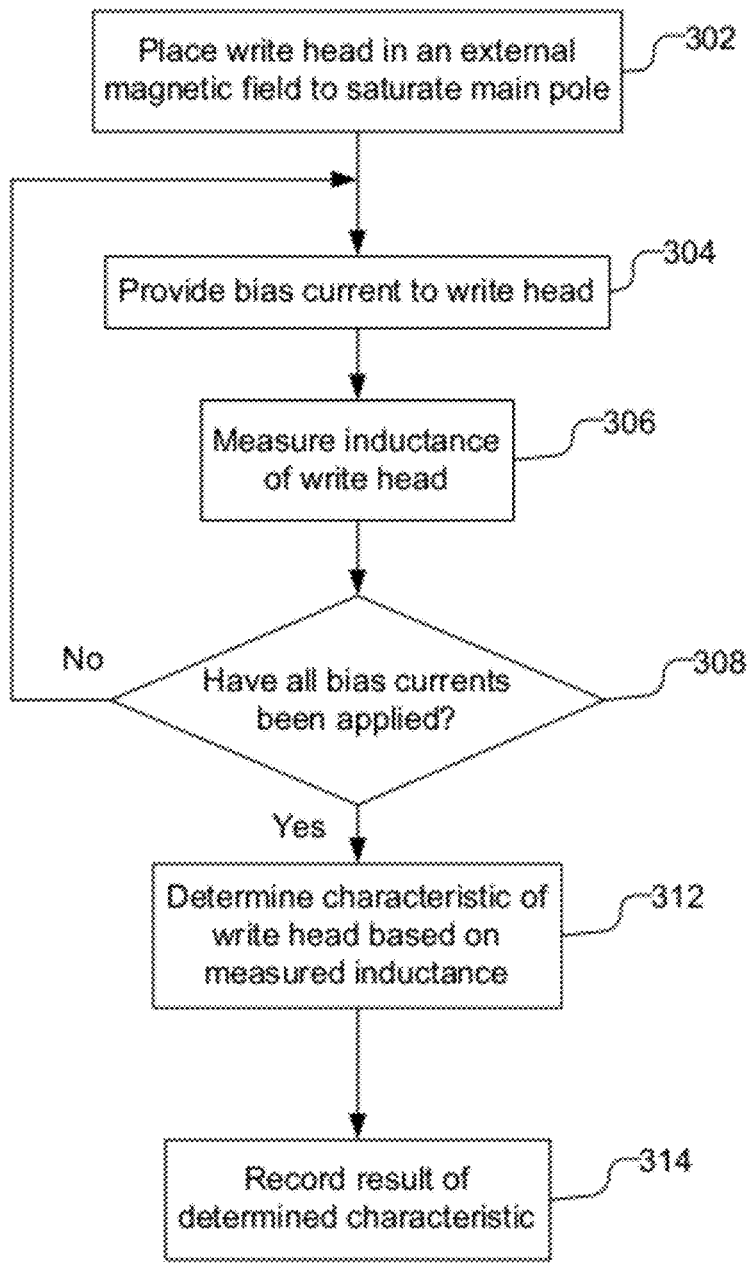
FIG. 10 is a flow chart illustrating a method of determining the efficiency of a write head in accordance with an embodiment of the present invention.

In another embodiment, the write head test device 100 can be used to measure other characteristics of a write head using an external magnetic field and applying a bias current or voltage to the write head to alter the magnetization of the write head. By way of example and not limitation, the overall efficiency of the write head or the corrosion of the recording pole 16 can be determined. FIG. 10 is a flow chart illustrating a method of determining a characteristic of the write head, such as a perpendicular write head 10, in accordance with an embodiment of the present invention. It should be understood that other types of write heads, such as longitudinal write heads, may similarly be tested using the process described in FIG. 10. First the write head 10 is placed in an external magnetic field that has a magnitude sufficient to at least partially saturate the main pole (block 302). By way of example, the external magnetic field can be increased until the measured inductance of the main pole 14 no longer decreases, at which point the main pole 14 is at least partially saturated. In one embodiment, the external magnetic field may be approximately parallel to the recording pole 16 in the write head. If desired, however, a non-parallel magnetic field may be used. FIG. 11A illustrates a write head 10 placed in a magnetic field that is parallel to the recording pole 16, illustrated by field lines, that partially saturates the main pole 14.

A bias current is then applied to the write head 10 by the write circuit 118 to produce a magnetic field in the main pole 14. The bias current may produce a magnetic field in the main pole 14 that has an opposite or the same polarity as the external magnetic field (block 304). The bias current may be a DC, sine wave, square wave or other form of current. The inductance of the write head is measured while the bias current is applied and the write head is in the external magnetic field (block 306). When no additional bias currents are to be applied (block 308), the characteristic of the write head may be determined based on the measured inductance(s) (block 312), which is then recorded, i.e., such as by storing in a fixed medium, such as storage or memory of the processor 106, or by displaying to a user, e.g., on a monitor or printed document (block 314).

In one embodiment, for example, multiple increasing bias currents are provided to the write head while in an external magnetic field and the inductance is measured to determine the bias current that will alter the magnetization of the write head, i.e., either increase or decrease the measured inductance. FIG. 11B illustrates the write head 10 in an external perpendicular magnetic field, where a bias current applied to the coil 12 has altered the magnetization of the write head, e.g., the main pole 14 is demagnetized by the bias current. By way of example, with a saturated write head in a 1500-1700 Oe perpendicular magnetic field, an inductance increase has been observed when a 10-15 mA bias DC current is applied; indicating that the main pole 14 is unsaturated.

The bias current required to alter the magnetization of the write head can be recorded, e.g., by processor 106 storing the data in memory. The bias current that is required to alter the magnetization of the write head in an external magnetic field varies from approximately 10 mA for the most effective write heads to approximately 25-30 mA for less effective write heads. The variation in bias current does not appear to be correlated with recession of the main pole 14, but instead appears to reflect how effectively the coil 12 is coupled to the yoke 24, i.e., how much flux is generated in the main pole 14 per applied current. The effective coupling of the coil may be a function of coil geometry, position and possibly variability of the yoke magnetic properties. Thus, based on the measured inductance and, in particular, the bias current that is increases or decreases the measured inductance, the characteristic, e.g., the efficiency, of the write head can be determined (block 312).

Figure 12:
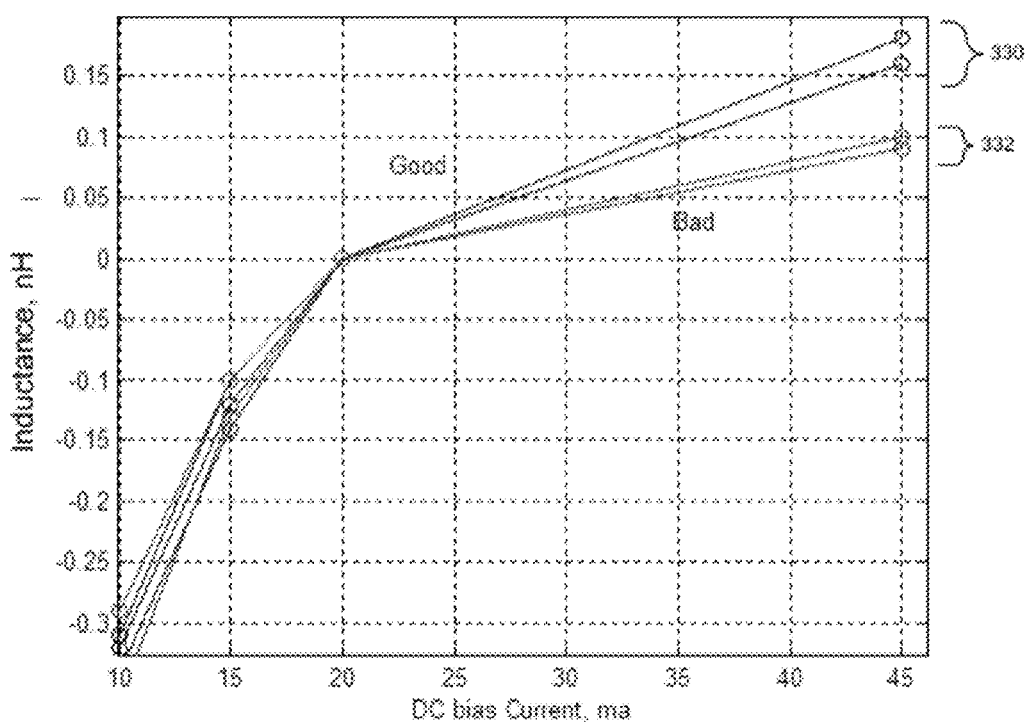
FIG. 12 is a graph illustrating the measured inductance of four write heads at different DC bias currents, while each write head is in an external magnetic field that partially saturates the yoke.

In another embodiment, one or more bias currents are provided to the write head while in an external magnetic field and the inductance is measured to determine a characteristic such as the corrosion of the recording pole 16. The magnitude of the external magnetic field may be selected close to the yoke saturation so that a bias current with one polarity produces little change in inductance, i.e., the yoke saturates, and a bias current with the opposite polarity produces a large change in inductance. FIG. 12 is a graph illustrating the measured inductance of four write heads at different DC bias currents, while each write head is in an external magnetic field that partially saturates the yoke. The inductance values for each write head is shown in FIG. 12 as normalized at a 20 mA bias current, i.e., the illustrated inductance values is the difference in the measured inductance at selected bias current and the measured inductance at 20 mA bias current. As can be seen, at 45 mA, two write heads (illustrated by lines 330), which are good, i.e., with uncorroded recording poles, have a measured inductance differential that is relatively high compared to the write heads (illustrated by lines 332), which are bad, i.e., with corroded recording poles. Thus, the measured inductance at one or more bias currents, while the write head is in an external magnetic field can be used to determine a characteristic such as the corrosion of the recording pole 16 (block 312). In one embodiment, multiple bias currents are provided and the inductance at each bias current is measured. A metric using the multiple inductance values, such as a differential between inductance values or the slope of the change in inductance values, can then be used to determine the desired characteristic. Alternatively, a single inductance value at a single bias current, e.g., at 45 ma or other appropriate bias current, can be measured and used to determine the desired characteristic, e.g., by comparing the measured inductance to an appropriate threshold or to inductance values for known good or known bad write heads.

In another embodiment, a write head can be tested for hysteresis effects by repeatably measuring the inductance after applying a magnetic field to the write head 10 by the write head tester 100. Many write heads exhibit hysteresis effects, in which domains are frozen in the yoke after saturation and the inductance does not return to the initial state. Write heads that suffer from hysteresis effect generally produce poor recording, as after a transition of a given polarity subsequent transition may not be written with the same field magnitude.

Figure 13:
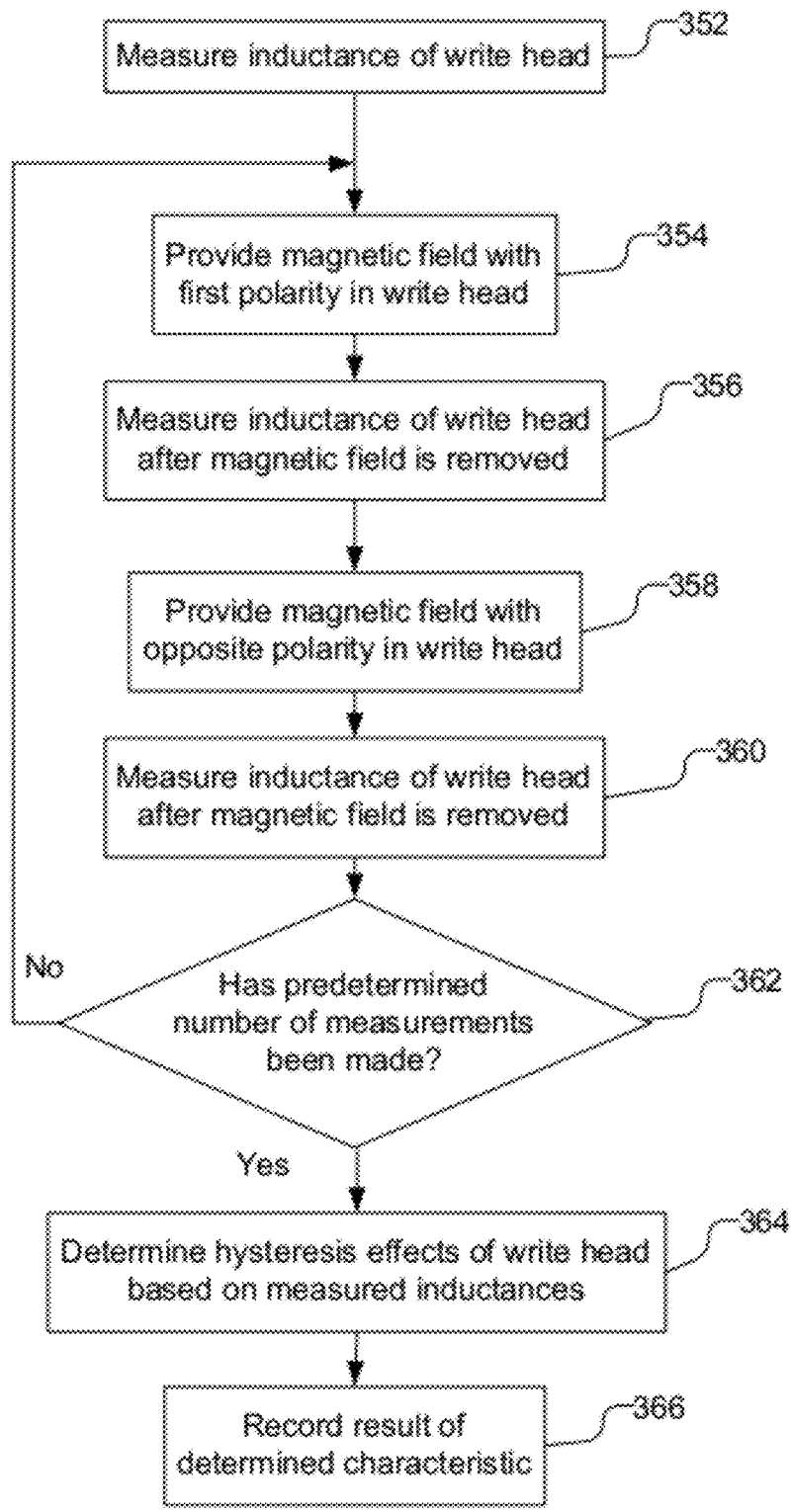
FIG. 13 is a flow chart illustrating a method of testing for hysteresis effects in a write head using the write head tester in accordance with an embodiment of the present invention.

FIG. 13 is a flow chart illustrating a method of testing for hysteresis effects in a write head, such as a perpendicular write head 10, using the write head tester 100 in accordance with an embodiment of the present invention. It should be understood that other types of write heads, such as longitudinal write heads, may similarly be tested using the process described in FIG. 13. First, the inductance of a write head 10 is measured with the inductance meter 114 (block 352) to measure an initial inductance. In some embodiments, the initial inductance may not be measured or used. A magnetic field of a first polarity is then applied to the write head 10 to produce a magnetic field that is parallel to the recording pole 16, e.g., by providing a bias current via write circuit 118 and/or by applying an external magnetic field using electromagnetic coils 102 (block 354). After removing the magnetic field, the inductance of the write head 10 is again measured (block 356). Another magnetic field with opposite polarity is then applied to the write head 10 (block 358) and the inductance is measured after the magnetic field is removed (block 360). In one embodiment, the second magnetic field may have the same magnitude as the first magnetic field, but in other embodiments it does not. Moreover, if desired, the first and second magnetic fields may be opposite but asymmetrical, e.g., the fields need not be 180 degrees apart. The process of applying magnetic fields and measuring the inductance is performed a predetermined number of times (block 362). The measured inductances are then analyzed to determine if the write head suffers from hysteresis effects (block 364). By way of example, the inductances measured after a magnetic field is applied, e.g., in blocks 356 and 358, can be compared to the initial measured inductance from block 352 and the differences averaged to determine the inductance variability. The results are recorded (block 366), e.g., such as by storing in a fixed medium, such as storage or memory of the processor 106, or by displaying to a user, e.g., on a monitor or printed document. By way of example, it has been observed that an inductance variability of 0.1-0.3 nH results in write heads that suffer from hysteresis effects, and a variability of less than 0.1 nH results in write heads that do not suffer from hysteresis effects.

Figure 14:
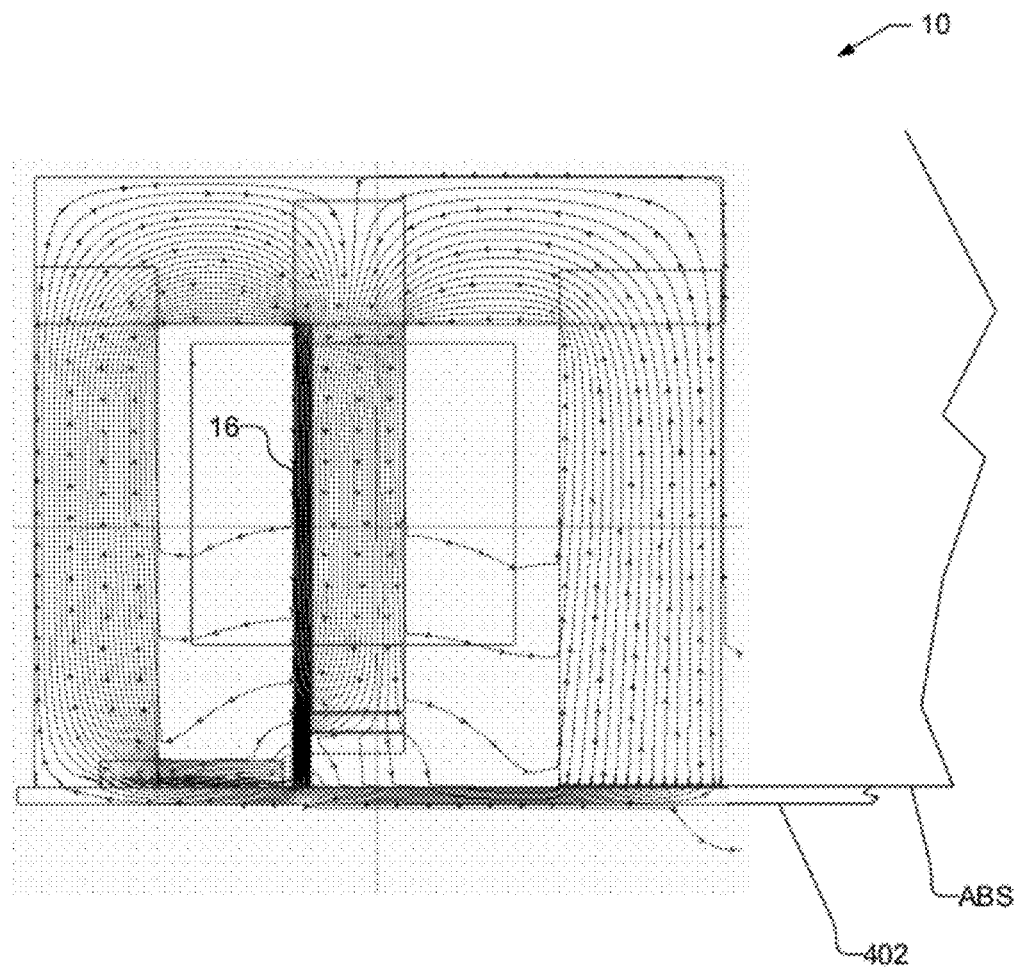
FIG. 14 illustrates a cross sectional view of a portion of a write head with a magnetic film placed in contact with the air bearing surface.

In another embodiment a magnetic film, e.g., NiFe, is placed in contact with the air bearing surface of the write head. FIG. 14 illustrates a cross sectional view of a portion of a write head 10 with a magnetic film 402 placed in contact with the air bearing surface (ABS). The magnetic flux generated by the write head 10 will close through the recording pole 16 and the magnetic film 402, which will automatically direct the flux through the magnetic pole region. When a recording pole 16 structure is present in the write head, the write head saturation will be relatively strong, and thus, there will be a small measured inductance. On the other hand, when the recording pole 16 structure is note present, e.g., corroded, the magnetic film 402 will be relatively far from the main pole region and the write head saturation will be weaker, and thus, a larger measured inductance. Thus, by applying a bias current to a write head 10 while the air bearing surface is in contact with a magnetic film 402, the presence of a magnetic pole may be determined and, thus, good and bad heads may be differentiated. The use of the magnetic film 402 placed in contact with the air bearing surface ABS may be used with any of the embodiments described herein.

Although the present invention is illustrated in connection with specific embodiments for instructional purposes, the present invention is not limited thereto. For example, while perpendicular write heads are described, the embodiments of the present invention may also be used with other types of write heads, such as longitudinal write heads. Various adaptations and modifications may be made without departing from the scope of the invention. Therefore, the spirit and scope of the appended claims should not be limited to the foregoing description.

What is claimed is:
1. A method comprising:
A) applying a first magnetic field with a first polarity to a write head;
B) measuring a first inductance of the write head after the first magnetic field has been removed;

C) applying a second magnetic field with a second polarity to the write head, the second polarity being opposite the first polarity;

D) measuring a second inductance of the write head after the second magnetic field has been removed;

E) measuring a third inductance of the write head, wherein the third inductance is an initial inductance measured before the first magnetic field is applied to the write head;

F) using the first inductance, the second inductance, and the third inductance to determine hysteresis of the write head; and G) recording the determined hysteresis of the write head.

2. The method of claim 1, wherein the write head is a perpendicular write head.

3. The method of claim 1, wherein the first magnetic field and the second magnetic field are parallel to a recording pole in the write head.

4. The method of claim 1, wherein the using the first inductance, the second inductance, and the third inductance to determine hysteresis of the write head comprises determining a variation of the first inductance and the second inductance from the third inductance and comparing the variation to a threshold.

5. The method of claim 1, further comprising applying to the write head and removing from the write head a fourth magnetic field and measuring a fourth inductance after the fourth magnetic field is removed, applying to the write head and removing from the write head a fifth magnetic field and measuring a fifth inductance after the fifth magnetic field is removed and using the fourth inductance and the fifth inductance with the first inductance, the second inductance, and the third inductance to determine the hysteresis of the write head.

6. The method of claim 1, wherein each of the applying a first magnetic field and the applying a second magnetic field is at least one of placing the write head in an external magnetic field and providing a bias current to the write head.

7. The method of claim 1, wherein each of the applying a first magnetic field and the applying a second magnetic field comprises providing a bias current to the write head to generate the first magnetic field and the second magnetic field, the method further comprising placing a magnetic film in physical contact with an air bearing surface of the write head, wherein magnetic flux of the first magnetic field and the second magnetic field generated by the write head is directed through the magnetic film.

8. An apparatus for testing a write head, the apparatus comprising:
a means for applying and removing magnetic fields of opposite polarities in a write head;
an inductance meter configured to be coupled to the write head; and
a processor coupled to the inductance meter and the means for applying and removing magnetic fields, the processor configured to receive inductance measurements from the inductance meter, the processor comprising a computer-usable medium having computer-readable program code embodied therein for causing the processor to A) control the means for applying and removing magnetic fields to apply to the write head and remove from the write head a first magnetic field with a first polarity; B) control the inductance meter to measure a first inductance of the write head after the first magnetic field is removed; C) control the means for applying and removing magnetic fields to apply to the write head and remove from the write head a second magnetic field with a second polarity that is opposite the first polarity; D) control the inductance meter to measure a second inductance of the write head after the second magnetic field is removed; E) control the inductance meter to measure a third inductance of the write head, wherein the third inductance is an initial inductance of the write head measured before the first magnetic field is applied to the write head; F) determine hysteresis of the write head based on the first inductance, the second inductance, and the third inductance; and G) record the determined hysteresis of the write head.

9. The apparatus of claim 8, wherein the first magnetic field and the second magnetic field are parallel to a recording pole in the write head.

10. The apparatus of claim 8, wherein the code causing the processor to determine the hysteresis of the write head based on the first inductance, the second inductance, and the third inductance comprises determining a variation of the first inductance and the second inductance from the third inductance and comparing the variation to a threshold.

11. The apparatus of claim 8, wherein the code causes the processor to control the means for applying and removing a magnetic field to apply to the write head and remove from the write head a fourth magnetic field and to control the inductance meter to measure a fourth inductance after the fourth third magnetic field is removed, apply to the write head and remove from the write head a fifth magnetic field and to control the inductance meter to measure a fifth inductance after the fifth magnetic field is removed; the code further causes the processor to determine the hysteresis of the write head based on the measured inductances from the first inductance, the second inductance, the third inductance, the fourth inductance, and the fifth inductance.

12. The apparatus of claim 8, wherein the means for applying and removing magnetic fields of opposite polarities in the write head is at least one of a magnetic field generator that produces an external magnetic field that is applied to the write head and a write circuit configured to be coupled to a write element of the write head to provide a bias current to the write element that produces a magnetic field.

13. The apparatus of claim 8, wherein the means for applying and removing magnetic fields of opposite polarities in the write head comprises a write circuit configured to be coupled to a write element of the write head to provide a bias current to the write element that generates a magnetic field, the apparatus further comprising a magnetic film, an air bearing surface of the write head is placed in physical contact with the magnetic film so that magnetic flux generated of the magnetic field generated by the write head is directed through the magnetic film.

* * * * *